(12) United States Patent
Rodgers et al.

(10) Patent No.: US 9,527,242 B2
(45) Date of Patent: Dec. 27, 2016

(54) METHOD FOR PRINTING THREE-DIMENSIONAL PARTS WTIH CRYSTALLIZATION KINETICS CONTROL

(71) Applicant: Stratasys, Inc., Eden Prairie, MN (US)

(72) Inventors: Luke M. B. Rodgers, Chaska, MN (US); Vittorio L. Jaker, New Brighton, MN (US)

(73) Assignee: Stratasys, Inc., Eden Prairie, MN (US)

( * ) Notice: Subject to any disclaimer, the term of this patent is extended or adjusted under 35 U.S.C. 154(b) by 68 days.

(21) Appl. No.: 14/532,465

(22) Filed: Nov. 4, 2014

(65) Prior Publication Data

US 2015/0145168 A1 May 28, 2015

Related U.S. Application Data

(63) Continuation-in-part of application No. 13/833,526, filed on Mar. 15, 2013.
(Continued)

(51) Int. Cl.
*B29C 41/02* (2006.01)
*B29C 67/00* (2006.01)
(Continued)

(52) U.S. Cl.
CPC ......... *B29C 67/0055* (2013.01); *B29B 13/022* (2013.01); *B29C 67/0059* (2013.01);
(Continued)

(58) Field of Classification Search
CPC ............ B29C 67/0055; B29C 67/0059; B29K 2071/00; B29K 2077/00; B33Y 10/00
(Continued)

(56) References Cited

U.S. PATENT DOCUMENTS

| 4,863,538 A | 9/1989 | Deckard |
| 5,132,143 A | 7/1992 | Deckard |

(Continued)

FOREIGN PATENT DOCUMENTS

| EP | 2465884 A1 | 6/2012 |
| WO | 2014081594 A1 | 5/2014 |

OTHER PUBLICATIONS

International Search Report and Written Opinion dated Jan. 28, 2014 for corresponding International Patent Application No. PCT/US2013/069793, filed Nov. 13, 2013.

(Continued)

*Primary Examiner* — Leo B Tentoni
(74) *Attorney, Agent, or Firm* — Westman, Champlin & Koehler, P.A.

(57) ABSTRACT

A method for printing a three-dimensional part with an additive manufacturing system, which includes providing a part material that compositionally has one or more semi-crystalline polymers and one or more secondary materials that are configured to retard crystallization of the one or more semi-crystalline polymers, where the one or more secondary materials are substantially miscible with the one or more semi-crystalline polymers. The method also includes melting the part material in the additive manufacturing system, forming at least a portion of a layer of the three-dimensional part from the melted part material in a build environment, and maintaining the build environment at an annealing temperature that is between a glass transition temperature of the part material and a cold crystallization temperature of the part material.

20 Claims, 8 Drawing Sheets

Related U.S. Application Data

(60) Provisional application No. 61/909,611, filed on Nov. 27, 2013, provisional application No. 61/729,043, filed on Nov. 21, 2012.

(51) Int. Cl.

| | | |
|---|---|---|
| *B29C 71/00* | (2006.01) | |
| *B29B 13/02* | (2006.01) | |
| *B29K 71/00* | (2006.01) | |
| *B29K 79/00* | (2006.01) | |
| *B29K 105/00* | (2006.01) | |
| *B33Y 10/00* | (2015.01) | |
| *B33Y 70/00* | (2015.01) | |
| *B29K 77/00* | (2006.01) | |
| *B29C 71/02* | (2006.01) | |
| *B29C 35/16* | (2006.01) | |

(52) U.S. Cl.
CPC .......... *B29C 71/0063* (2013.01); *B29C 71/02* (2013.01); *B29C 2035/1658* (2013.01); *B29C 2071/022* (2013.01); *B29K 2071/00* (2013.01); *B29K 2077/00* (2013.01); *B29K 2079/085* (2013.01); *B29K 2105/0002* (2013.01); *B29K 2995/004* (2013.01); *B33Y 10/00* (2014.12); *B33Y 70/00* (2014.12)

(58) Field of Classification Search
USPC ........................................................ 264/308
See application file for complete search history.

(56) References Cited

U.S. PATENT DOCUMENTS

| | | | |
|---|---|---|---|
| 5,503,785 A | | 4/1996 | Crump et al. |
| 5,866,058 A | | 2/1999 | Batchelder et al. |
| 6,004,124 A | | 12/1999 | Swanson et al. |
| 6,160,080 A | * | 12/2000 | Cucinella ............... C08G 69/02 524/600 |
| 6,923,634 B2 | | 8/2005 | Swanson et al. |
| 7,384,255 B2 | | 6/2008 | LaBossiere et al. |
| 7,604,470 B2 | | 10/2009 | LaBossiere et al. |
| 7,625,200 B2 | | 12/2009 | Leavitt |
| 7,896,209 B2 | | 3/2011 | Batchelder et al. |
| 7,910,041 B1 | * | 3/2011 | Priedeman, Jr. .... B29C 67/0055 264/308 X |
| 8,153,182 B2 | | 4/2012 | Comb et al. |
| 2002/0111707 A1 | * | 8/2002 | Li ....................... B29C 67/0059 700/118 |
| 2007/0123092 A1 | | 5/2007 | Legrand |
| 2009/0295042 A1 | | 12/2009 | Pfister et al. |
| 2010/0010169 A1 | | 1/2010 | Tsai et al. |
| 2011/0161056 A1 | * | 6/2011 | Mueller ............. B29C 67/0081 703/1 |
| 2011/0233804 A1 | | 9/2011 | Batchelder et al. |
| 2011/0236683 A1 | | 9/2011 | Takebe et al. |
| 2012/0164256 A1 | | 6/2012 | Swanson et al. |
| 2012/0231225 A1 | | 9/2012 | Mikulak et al. |
| 2012/0259052 A1 | | 10/2012 | Nelson et al. |
| 2013/0077997 A1 | | 3/2013 | Hanson et al. |
| 2013/0186549 A1 | | 7/2013 | Comb et al. |
| 2013/0186558 A1 | | 7/2013 | Comb et al. |
| 2013/0333798 A1 | | 12/2013 | Bosveld et al. |
| 2013/0337256 A1 | | 12/2013 | Farmer et al. |
| 2014/0141166 A1 | * | 5/2014 | Rodgers ................ B29C 7/0055 427/256 |

OTHER PUBLICATIONS

International Search Report and Written Opinion dated Feb. 13, 2015 for corresponding International Application No. PCT/US2014/067093, filed Nov. 24, 2014.

Invitation to Pay Additional Fees dated Aug. 5, 2016 for corresponding International Application No. PCT/US2016/034096, filed May 25, 2016.

\* cited by examiner

METHOD FOR PRINTING THREE-DIMENSIONAL PARTS WTIH CRYSTALLIZATION KINETICS CONTROL

CROSS-REFERENCE TO RELATED APPLICATION(S)

The present application is a continuation-in-part of U.S. patent application Ser. No. 13/833,526, filed Mar. 15, 2013, which claims priority to U.S. Provisional Patent Application No. 61/729,043, filed on Nov. 21, 2012 and the present application also claims priority to U.S. Provisional Application No. 61/909,611, entitled "METHOD FOR PRINTING THREE-DIMENSIONAL PARTS WITH CRYSTALLIZATION KINETICS CONTROL", and filed on Nov. 27, 2013, the contents of which are hereby incorporated in their entirety.

BACKGROUND

The present disclosure relates to additive manufacturing techniques for printing three-dimensional (3D) parts. In particular, the present disclosure relates to additive manufacturing methods for printing 3D parts in a layer-by-layer manner from part materials having one or more semi-crystalline polymeric materials.

Additive manufacturing systems are used to print or otherwise build 3D parts from digital representations of the 3D parts (e.g., AMF and STL format files) using one or more additive manufacturing techniques. Examples of commercially available additive manufacturing techniques include extrusion-based techniques, jetting, selective laser sintering, powder/binder jetting, electron-beam melting, and stereolithographic processes. For each of these techniques, the digital representation of the 3D part is initially sliced into multiple horizontal layers. For each sliced layer, a tool path is then generated, which provides instructions for the particular additive manufacturing system to print the given layer.

For example, in an extrusion-based additive manufacturing system, a 3D part may be printed from a digital representation of the 3D part in a layer-by-layer manner by extruding a flowable part material. The part material is extruded through an extrusion tip carried by a print head of the system, and is deposited as a sequence of roads on a substrate in an x-y plane. The extruded part material fuses to previously deposited part material, and solidifies upon a drop in temperature. The position of the print head relative to the substrate is then incremented along a z-axis (perpendicular to the x-y plane), and the process is then repeated to form a 3D part resembling the digital representation.

In fabricating 3D parts by depositing layers of a part material, supporting layers or structures are typically built underneath overhanging portions or in cavities of 3D parts under construction, which are not supported by the part material itself. A support structure may be built utilizing the same deposition techniques by which the part material is deposited. The host computer generates additional geometry acting as a support structure for the overhanging or free-space segments of the 3D part being formed. Support material is then deposited from a second nozzle pursuant to the generated geometry during the printing process. The support material adheres to the part material during fabrication, and is removable from the completed 3D part when the printing process is complete.

SUMMARY

An aspect of the present disclosure is directed to a method for printing a 3D part with an additive manufacturing system. The method includes providing a part material that compositionally includes one or more semi-crystalline polymers and one or more secondary materials that are configured to retard crystallization of the one or more semi-crystalline polymers, where the one or more secondary materials are substantially miscible with the one or more semi-crystalline polymers. The method also includes melting the part material in the additive manufacturing system, forming at least a portion of a layer of the 3D part from the melted part material in a build environment, and maintaining the build environment at an annealing temperature that is between a glass transition temperature of the part material and a cold crystallization temperature of the part material.

Another aspect of the present disclosure is directed to a method for printing a 3D part from with an additive manufacturing system, where the method includes providing a part material that compositionally comprises one or more semi-crystalline polymers and one or more amorphous polymers that are substantially miscible with the one or more semi-crystalline polymers. The method also includes maintaining a build environment of the additive manufacturing system, at least in a deposition region of the build environment, at an annealing temperature that is between a glass transition temperature of the part material and a cold crystallization temperature of the part material. The method also includes feeding the part material to a print head retained by of the additive manufacturing system, melting the part material in the print head, extruding the melted part material from the print head, and depositing the extruded part material onto a build surface in the deposition region to form at least a portion of a layer of the 3D part from the extruded part material.

Another aspect of the present disclosure is directed to a method for printing a 3D part from with an additive manufacturing system, where the method includes providing a part material that compositionally comprises one or more semi-crystalline polymers and one or more amorphous polymers that are substantially miscible with the one or more semi-crystalline polymers. The method also includes melting the part material in the additive manufacturing system, forming layers of the three-dimensional part from the melted part material using an additive manufacturing technique, wherein the layers are formed in a region that is maintained at an annealing temperature that is similar to a glass transition temperature of the part material (e.g., within about 10° C.), and reheating the printed three-dimensional part to one or more temperatures that are within a small range of a cold crystallization temperature of the part material (e.g., within about 10° C.).

Another aspect of the present disclosure is directed to a method for printing a 3D part from with a selective laser sintering system. The method includes providing a part material that compositionally comprises one or more semi-crystalline polymers and one or more amorphous polymers that are substantially miscible with the one or more semi-crystalline polymers. The methods also includes forming layers of the 3D part from the part material using the selective laser sintering system, and maintaining an environmental temperature for the formed layers that is between a hot crystallization temperature of the part material and a melting temperature of the part material.

DEFINITIONS

Unless otherwise specified, the following terms as used herein have the meanings provided below:

The term "polymer" refers to a polymeric material having one or more monomer species, including homopolymers, copolymers, terpolymers, and the like.

The term "semi-crystalline polymer" refers to a polymer capable of exhibiting an average percent crystallinity in a solid state of at least about 10% by weight when allowed to crystallize to its fullest extent. The term "semi-crystalline polymer" includes polymeric materials capable of having crystallinities up to 100% (i.e., fully-crystalline polymeric materials). The term "amorphous polymer" refers to a polymer that is not a semi-crystalline polymer.

Reference to "a" chemical compound refers one or more molecules of the chemical compound, rather than being limited to a single molecule of the chemical compound. Furthermore, the one or more molecules may or may not be identical, so long as they fall under the category of the chemical compound. Thus, for example, "a" polyamide is interpreted to include one or more polymer molecules of the polyamide, where the polymer molecules may or may not be identical (e.g., different molecular weights and/or isomers).

The terms "at least one" and "one or more of" an element are used interchangeably, and have the same meaning that includes a single element and a plurality of the elements, and may also be represented by the suffix "(s)" at the end of the element. For example, "at least one polyamide", "one or more polyamides", and "polyamide(s)" may be used interchangeably and have the same meaning.

Directional orientations such as "above", "below", "top", "bottom", and the like are made with reference to a layer-printing direction of a 3D part. In the embodiments shown below, the layer-printing direction is the upward direction along the vertical z-axis. In these embodiments, the terms "above", "below", "top", "bottom", and the like are based on the vertical z-axis. However, in embodiments in which the layers of 3D parts are printed along a different axis, such as along a horizontal x-axis or y-axis, the terms "above", "below", "top", "bottom", and the like are relative to the given axis.

Unless otherwise specified, characteristics of a material or a 3D part printed from the material refer to the characteristics as measured parallel to the orientation of the 3D part layers and perpendicular to the layer-printing direction, and is referred to as an "xy-direction". Correspondingly, the term "z-direction", with reference to characteristics of a material or a 3D part printed from the material refer to the characteristics as measured perpendicular to the orientation of the 3D part layers and parallel to the layer-printing direction. Unless the measurement direction is specified as "in the z-direction", a measurement referred to herein is taken in the xy-direction. For example, a tensile strength of a 3D part of 10,000 psi refers to a tensile strength measured parallel to the layers of the 3D part. Alternatively, a tensile strength of a 3D part in the z-direction of 8,000 psi refers to a tensile strength measured perpendicular to the layers of the 3D part.

Unless otherwise specified, temperatures referred to herein are based on atmospheric pressure (i.e. one atmosphere).

The term "additive manufacturing system" refers to a system that prints, builds, or otherwise produces 3D parts and/or support structures at least in part using an additive manufacturing technique. The additive manufacturing system may be a stand-alone unit, a sub-unit of a larger system or production line, and/or may include other non-additive manufacturing features, such as subtractive-manufacturing features, pick-and-place features, two-dimensional printing features, and the like.

The term "providing", such as for "providing a consumable material", when recited in the claims, is not intended to require any particular delivery or receipt of the provided item. Rather, the term "providing" is merely used to recite items that will be referred to in subsequent elements of the claim(s), for purposes of clarity and ease of readability.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the present disclosure.

The terms "about" and "substantially" are used herein with respect to measurable values and ranges due to expected variations known to those skilled in the art (e.g., limitations and variabilities in measurements).

DETAILED DESCRIPTION

Figure 1:
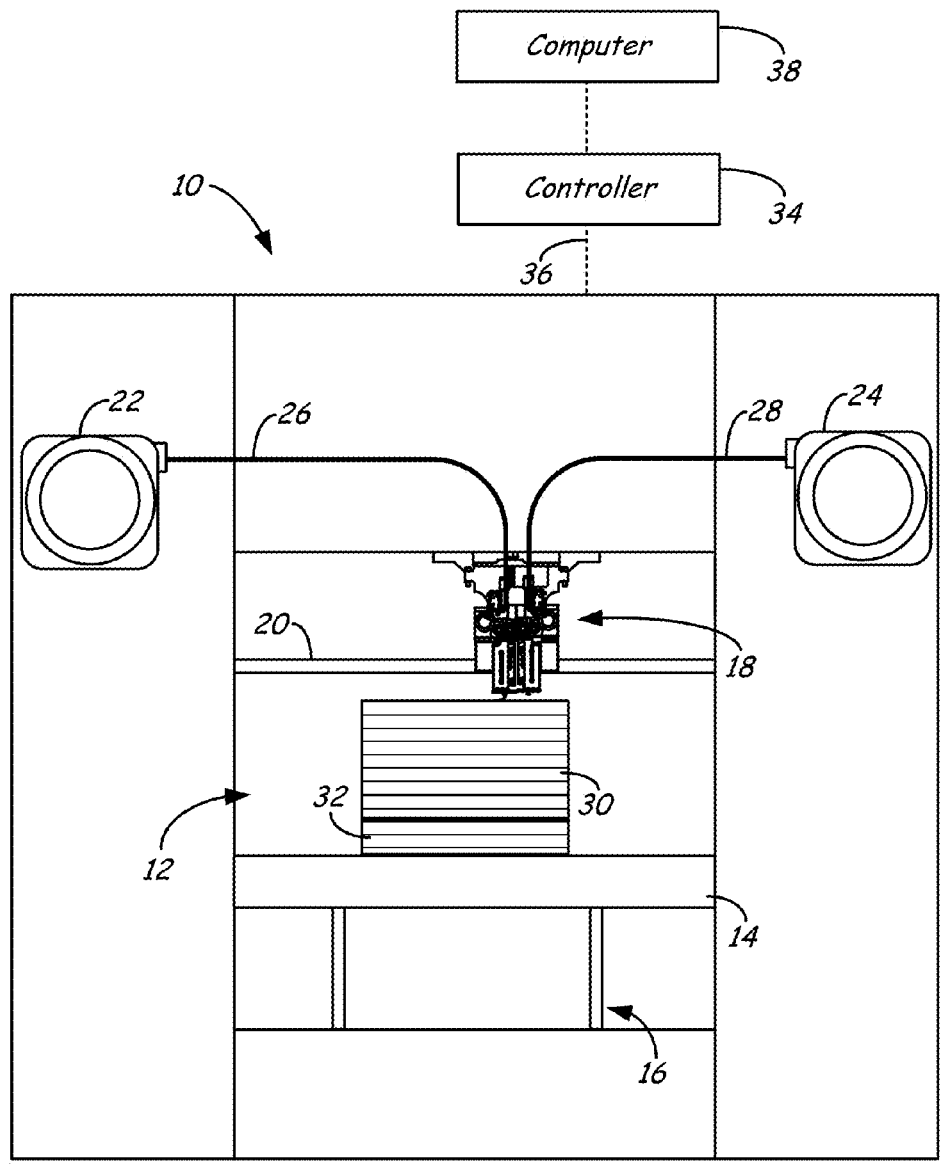
FIG. 1 is a front view of an additive manufacturing system configured to print 3D parts pursuant to the method of the present disclosure.

The present disclosure is directed to an additive manufacturing method for printing 3D parts in a layer-by-layer manner from a part material that, in a preferred embodiment, compositionally includes a blend of one or more semi-crystalline polymers and one or more secondary materials that retard crystallization of the semi-crystalline polymer(s), such as one or more amorphous polymers that are at least partially miscible with the semi-crystalline polymer(s). In particular, the method involves controlling the crystallization kinetics of the semi-crystalline polymer(s) upon cooling from a melted state to minimize or otherwise reduce the percent crystallinity of the printed part material, while also generating enough crystallization-exothermic energy to induce molecular reptation at the extrudate-part interface.

As discussed below, the manner in which the crystallization kinetics of the part material are controlled can vary depending on the additive manufacturing technique used, such as an extrusion-based additive manufacturing technique, an electrophotography-based additive manufacturing technique, or a selective laser sintering technique. These distinctions are primarily due to the different thermal states in which the printed layers are typically held for the given additive manufacturing techniques. As such, the following discussion initially focuses on controlling the crystallization kinetics in an extrusion-based additive manufacturing system, and the applications for use in an electrophotography-based additive manufacturing and a selective laser sintering system will be subsequently discussed.

Extrusion-based additive manufacturing systems typically print or otherwise build 3D parts from amorphous polymeric materials, such as acrylonitrile-butadiene-styrene (ABS) resins and polycarbonate resins. During a printing operation, the amorphous polymeric material is melted and extruded as a series of roads, which cool down to form layers of a 3D part. Due to the layer-by-layer nature of the printing, the cooling of each successive layer generates residual stresses in the 3D part, which are a function of the coefficient of thermal expansion, percent shrinkage, and tensile modulus of the material. If not relieved, the residual stresses may physically distort the 3D part, such as by causing the edges and corners of the 3D part to curl up, referred to as "curl" or "curling".

Amorphous polymeric materials have little or no ordered arrangements of their polymer chains in their solid states. As such, these materials exhibit glass transition effects that can be controlled to partially relieve residual stresses. For example, as disclosed in Batchelder, U.S. Pat. No. 5,866,058, an amorphous polymeric material may be deposited into a heated chamber (or at least a locally-heat deposition region) maintained at a temperature that is between a solidification temperature and a glass transition temperature of the material. This anneals the successively-printed printed layers, allowing them to cool down and solidify slowly, which can partially relieve the residual stresses.

Semi-crystalline polymeric materials, however, have different mechanical and thermal characteristics from amorphous polymeric materials. For example, due to their achievable crystallinity, 3D parts printed with semi-crystalline polymeric materials may exhibit superior mechanical properties compared to 3D parts printed with amorphous polymeric materials. However, due to their higher levels of achievable crystallinity, semi-crystalline polymeric materials can exhibit discontinuous changes in volume upon solidification. Therefore, layers of a semi-crystalline polymeric material may contract and shrink when deposited, thereby accumulating residual stresses.

In comparison to amorphous polymeric materials, which can have relatively broad annealing windows, it has been conventionally difficult to maintain a temperature window that is suitable for annealing semi-crystalline polymers, particularly with extrusion-based additive manufacturing systems. For instance, curl will result if we hold the polymer above the window, as will curl result if below the window. Any variations outside of this small temperature window will result in solidification with discontinuous changes in volume, such as curl, if above or below the temperature window. The discontinuous changes in volume can be particularly troublesome for extrusion-based additive manufacturing systems where the printed 3D parts or support structures are coupled to underlying and non-shrinkable build sheets. Furthermore, sagging may occur if there is not enough crystallinity generated during the cooling process. Each of these conditions may result in distortions of the printed 3D part. As such, it has been difficult to print dimensionally stable 3D parts from semi-crystalline polymers using extrusion-based additive manufacturing systems, where the amount of crystallinity formed during the cooling process is sufficient such that the 3D parts do not sag, yet also do not induce curl forces that will curl the 3D part.

However, as discussed below, the crystallization kinetics of particular part materials can be controlled in an extrusion-based additive manufacturing system to print 3D parts having mechanical properties (e.g., strengths and ductilities) similar to those of semi-crystalline polymeric materials, while also being annealable in a heated chamber of an additive manufacturing system (or at least a locally-heated deposition region) to partially relieve residual stresses.

Figure 2:
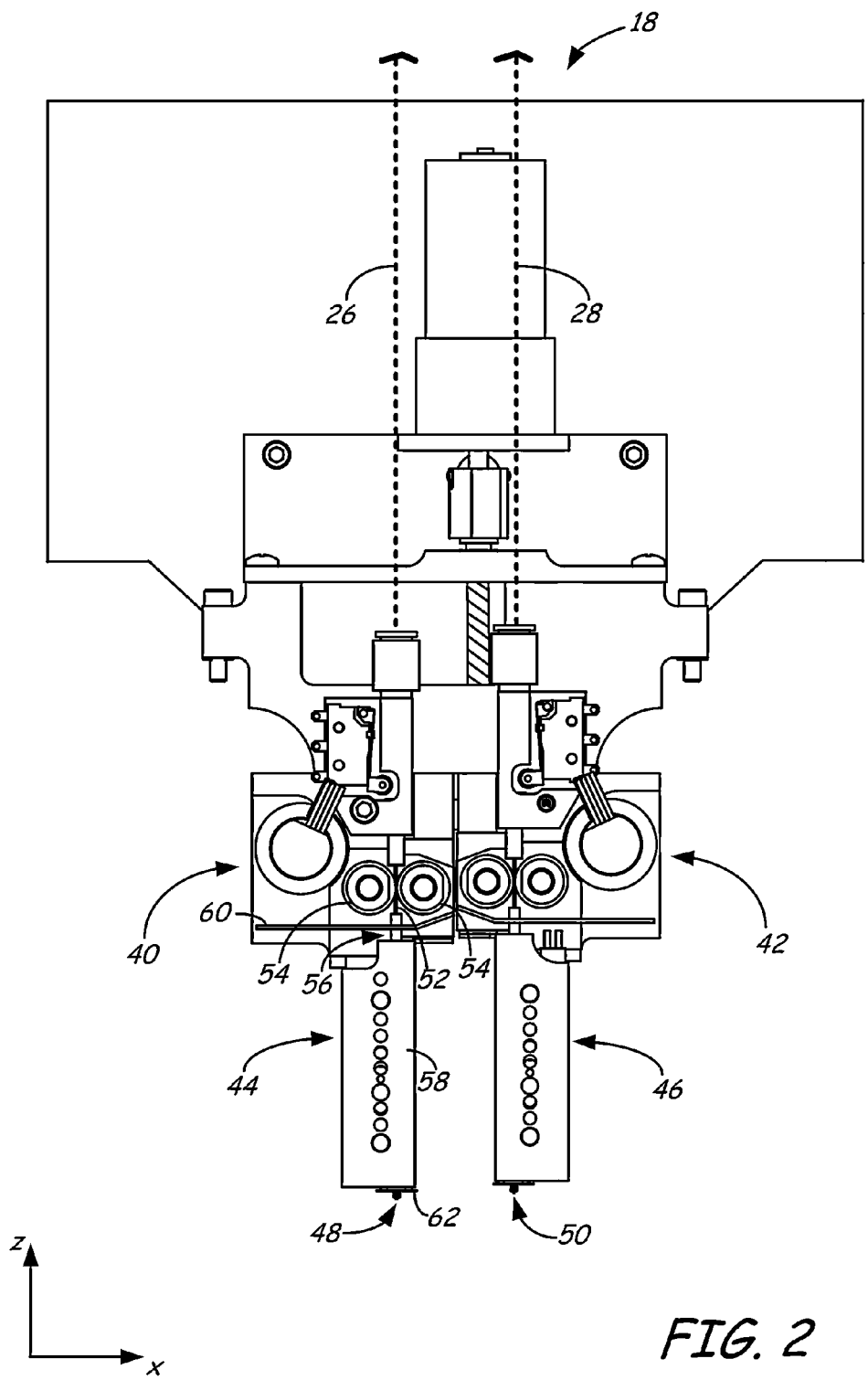
FIG. 2 is a front view of a print head of the additive manufacturing system.
Figure 3:
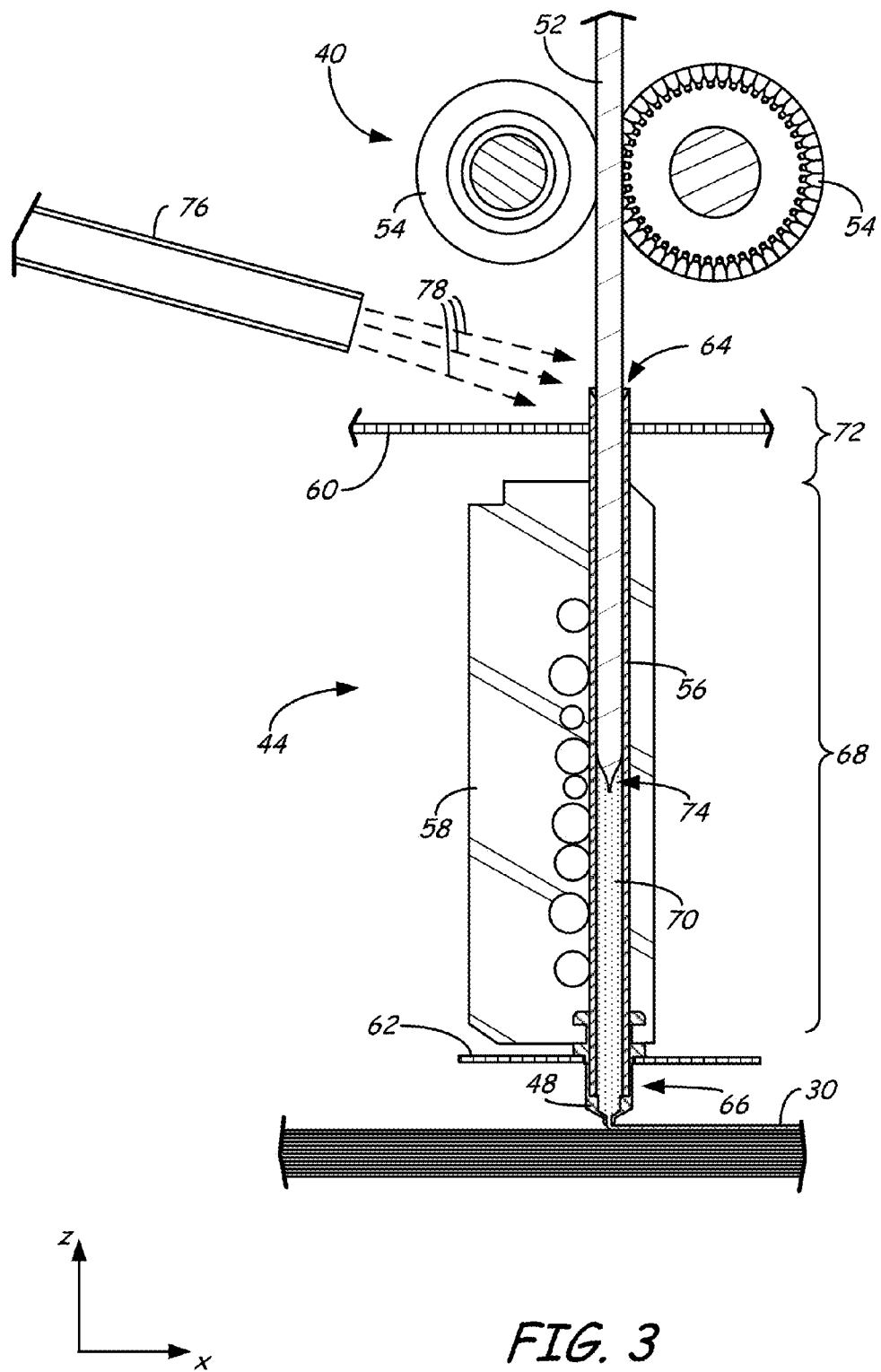
FIG. 3 is an expanded sectional view of a drive mechanism, a liquefier assembly, and a nozzle of the print head.

FIGS. 1-3 illustrate system 10, which is an example extrusion-based additive manufacturing system for printing or otherwise building 3D parts, from the part material blends discussed herein, in a manner that controls the crystallization kinetics, as discussed below. Suitable extrusion-based additive manufacturing systems for system 10 include fused deposition modeling systems developed by Stratasys, Inc., Eden Prairie, Minn. under the trademark "FDM".

As shown in FIG. 1, system 10 may include chamber 12, platen 14, platen gantry 16, print head 18, head gantry 20, and consumable assemblies 22 and 24. Chamber 12 is an example enclosed build environment that contains platen 14 for printing 3D parts and support structures, where chamber 12 may be may be optionally omitted and/or replaced with different types of build environments. For example, a 3D part and support structure may be built in a build environment that is open to ambient conditions or may be enclosed with alternative structures (e.g., flexible curtains).

In the shown example, the interior volume of chamber 12 may be heated with heater 12h to reduce the rate at which the part and support materials solidify after being extruded and deposited (e.g., to reduce distortions and curling). Heater 12h may be any suitable device or assembly for heating the interior volume of chamber 12, such as by radiant heating and/or by circulating heated air or other gas (e.g., inert gases). In alternative embodiments, heater 12h may be replaced with other conditioning devices, such as a cooling unit to generate and circulate cooling air or other gas. The particular thermal conditions for the build environment may vary depending on the particular consumable materials used.

In further embodiments, the heating may be localized rather than in an entire chamber 12. For example, the deposition region may be heated in a localized manner. Example techniques for locally-heating a deposition region include heating platen 14 and/or with directing heat air jets towards platen 14 and/or the 3D parts/support structures being printed). As discussed above, the heating in chamber 12 and/or the localized deposition region anneals the printed layers of the 3D parts (and support structures) to partially relieve the residual stresses, thereby reducing curling of the 3D parts.

Platen 14 is a platform on which 3D parts and support structures are printed in a layer-by-layer manner. In some embodiments, platen 14 may also include a flexible polymeric film or liner on which the 3D parts and support structures are printed. In the shown example, print head 18 is a dual-tip extrusion head configured to receive consumable filaments from consumable assemblies 22 and 24 (e.g., via guide tubes 26 and 28) for printing 3D part 30 and support structure 32 on platen 14. Consumable assembly 22 may contain a supply of the part material for printing 3D part 30 from the part material. Consumable assembly 24 may contain a supply of a support material for printing support structure 32 from the given support material.

Platen 14 is supported by platen gantry 16, which is a gantry assembly configured to move platen 14 along (or substantially along) a vertical z-axis. Correspondingly, print head 18 is supported by head gantry 20, which is a gantry assembly configured to move print head 18 in (or substantially in) a horizontal x-y plane above chamber 12.

In an alternative embodiment, platen 14 may be configured to move in the horizontal x-y plane within chamber 12, and print head 18 may be configured to move along the z-axis. Other similar arrangements may also be used such that one or both of platen 14 and print head 18 are moveable relative to each other. Platen 14 and print head 18 may also be oriented along different axes. For example, platen 14 may be oriented vertically and print head 18 may print 3D part 30 and support structure 32 along the x-axis or the y-axis.

System 10 also includes controller 34, which is one or more control circuits configured to monitor and operate the components of system 10. For example, one or more of the control functions performed by controller 34 can be implemented in hardware, software, firmware, and the like, or a combination thereof. Controller 34 may communicate over communication line 36 with chamber 12 (e.g., with a heating unit for chamber 12), print head 18, and various sensors, calibration devices, display devices, and/or user input devices.

In some embodiments, controller 34 may also communicate with one or more of platen 14, platen gantry 16, head gantry 20, and any other suitable component of system 10. While illustrated as a single signal line, communication line 36 may include one or more electrical, optical, and/or wireless signal lines, allowing controller 34 to communicate with various components of system 10. Furthermore, while illustrated outside of system 10, controller 34 and communication line 36 may be internal components to system 10.

System 12 and/or controller 34 may also communicate with computer 38, which is one or more computer-based systems that communicates with system 12 and/or controller 34, and may be separate from system 12, or alternatively may be an internal component of system 12. Computer 38 includes computer-based hardware, such as data storage devices, processors, memory modules and the like for generating and storing tool path and related printing instructions. Computer 38 may transmit these instructions to system 10 (e.g., to controller 34) to perform printing operations. Controller 34 and computer 38 may collectively be referred to as a controller assembly for system 10.

FIG. 2 illustrates a suitable device for print head 18, as described in Leavitt, U.S. Pat. No. 7,625,200. Additional examples of suitable devices for print head 18, and the connections between print head 18 and head gantry 20 include those disclosed in Crump et al., U.S. Pat. No. 5,503,785; Swanson et al., U.S. Pat. No. 6,004,124; LaBossiere, et al., U.S. Pat. Nos. 7,384,255 and 7,604,470; Batchelder et al., U.S. Pat. No. 7,896,209; and Comb et al., U.S. Pat. No. 8,153,182. In additional embodiments, in which print head 18 is an interchangeable, single-nozzle print head, examples of suitable devices for each print head 18, and the connections between print head 18 and head gantry 20 include those disclosed in Swanson et al., U.S. Patent Application Publication No. 2012/0164256.

In the shown dual-tip embodiment, print head 18 includes two drive mechanism 40 and 42, two liquefier assemblies 44 and 46, and two nozzles 48 and 50. In this embodiment the part material and the support material each preferably have a filament geometry for use with print head 18. For example, as best shown in FIG. 3, the part material may be provided as filament 52. In alternative embodiments, the part material of the present disclosure may be provided in powder or pellet form for use in an auger-pump print head, such as disclosed in Bosveld et al., U.S. Publication No. 2013/0333798.

During operation, controller 34 may direct wheels 54 of drive mechanism 40 to selectively draw successive segments filament 52 from consumable assembly 22 (via guide tube 26), and feed filament 52 to liquefier assembly 44. Liquefier assembly 44 may include liquefier tube 56, thermal block 58, heat shield 60, and tip shield 62, where liquefier tube 56 includes inlet end 64 for receiving the fed filament 52. Nozzle 48 and tip shield 62 are accordingly secured to outlet end 66 of liquefier tube 56, and liquefier tube 56 extends through thermal block 58 and heat shield 60.

While liquefier assembly 44 is in its active state, thermal block 58 heats liquefier tube 56 to define heating zone 68. The heating of liquefier tube 56 at heating zone 68 melts the part material of filament 52 in liquefier tube 56 to form melt 70. The upper region of liquefier tube 56 above heating zone 68, referred to as transition zone 72, is not directly heated by thermal block 58. This generates a thermal gradient or profile along the longitudinal length of liquefier tube 56.

The molten portion of the part material (i.e., melt 70) forms meniscus 74 around the unmelted portion of filament 52. During an extrusion of melt 70 through nozzle 48, the downward movement of filament 52 functions as a viscosity pump to extrude the part material of melt 70 out of nozzle 48 as extruded roads to print 3D part 30 in a layer-by-layer manner. While thermal block 58 heats liquefier tube 56 at heating zone 68, cooling air may also be blown through a manifold 76 toward inlet end 64 of liquefier tube 56, as depicted by arrows 78. Heat shield 60 assists in directing the air flow toward inlet end 64. The cooling air reduces the temperature of liquefier tube 56 at inlet end 64, which prevents filament 52 from softening or melting at transition zone 72.

In some embodiments, controller 34 may servo or swap liquefier assemblies 44 and 46 between opposing active and stand-by states. For example, while liquefier assembly 46 is served to its active state for extruding the support material to print a layer of support structure 32, liquefier assembly 44 is switched to a stand-by state to prevent the part material from being extruded while liquefier assembly 46 is being used. After a given layer of the support material is completed, controller 34 then serves liquefier assembly 46 to its stand-by state, and switches liquefier assembly 44 to its active state for extruding the part material to print a layer of 3D part 30. This servo process may be repeated for each printed layer until 3D part 30 and support structure 32 are completed.

While liquefier assembly 46 is in its active state for printing support structure 32 from a support material filament, drive mechanism 42, liquefier assembly 46, and nozzle 50 (each shown in FIG. 2) may operate in the same manner as drive mechanism 40, liquefier assembly 44, and nozzle 48 for extruding the support material. In particular, drive mechanism 40 may draw successive segments of the support material filament from consumable assembly 24 (via guide tube 28), and feed the support material filament to liquefier assembly 46. Liquefier assembly 46 thermally melts the successive segments of the received support material filament such that it becomes a molten support material. The molten support material may then be extruded and deposited from nozzle 50 as a series of roads onto platen 14 for printing support structure 32 in a layer-by-layer manner in coordination with the printing of 3D part 30.

As mentioned above, the part material compositionally includes a blend of one or more semi-crystalline polymers and one or more secondary materials that retard crystallization of the semi-crystalline polymer(s). Preferably, the secondary material(s) include one or more amorphous polymers that are at least partially miscible with the semi-crystalline polymer(s). The following discussion is made with reference to the secondary material(s) as amorphous polymer(s) with the understanding that the part material may alternatively include other non-amorphous polymer(s) to retard crystallization of the semi-crystalline polymer(s). Nonetheless, amorphous polymer(s) are preferred as they may also provide additional desired characteristics to the part material.

More preferably, the semi-crystalline polymer(s) and the amorphous polymer(s) are substantially miscible with each other. The substantially miscible blend may exhibit a co-continuous phase of the semi-crystalline polymer(s) and the amorphous polymer(s), or more preferably a single continuous phase of the semi-crystalline polymer(s) and the amorphous polymer(s). While not wishing to be bound by theory, it is believed that this miscibility allows the amorphous polymer(s) to physically impede the semi-crystalline polymer(s) from forming crystalline regions, which accordingly retards crystallization.

In some embodiments, the amorphous polymer(s) of the part material have substantially no measurable melting points (less than 5 calories/gram) using differential scanning calorimetry (DSC) pursuant to ASTM D3418-08. Correspondingly, in these embodiments, the semi-crystalline polymer(s) of the part material have measureable melting points (5 calories/gram or more) using DSC pursuant to ASTM D3418-08. As discussed below, the part material may also optionally include one or more additives dispersed in the blend.

Figure 4:
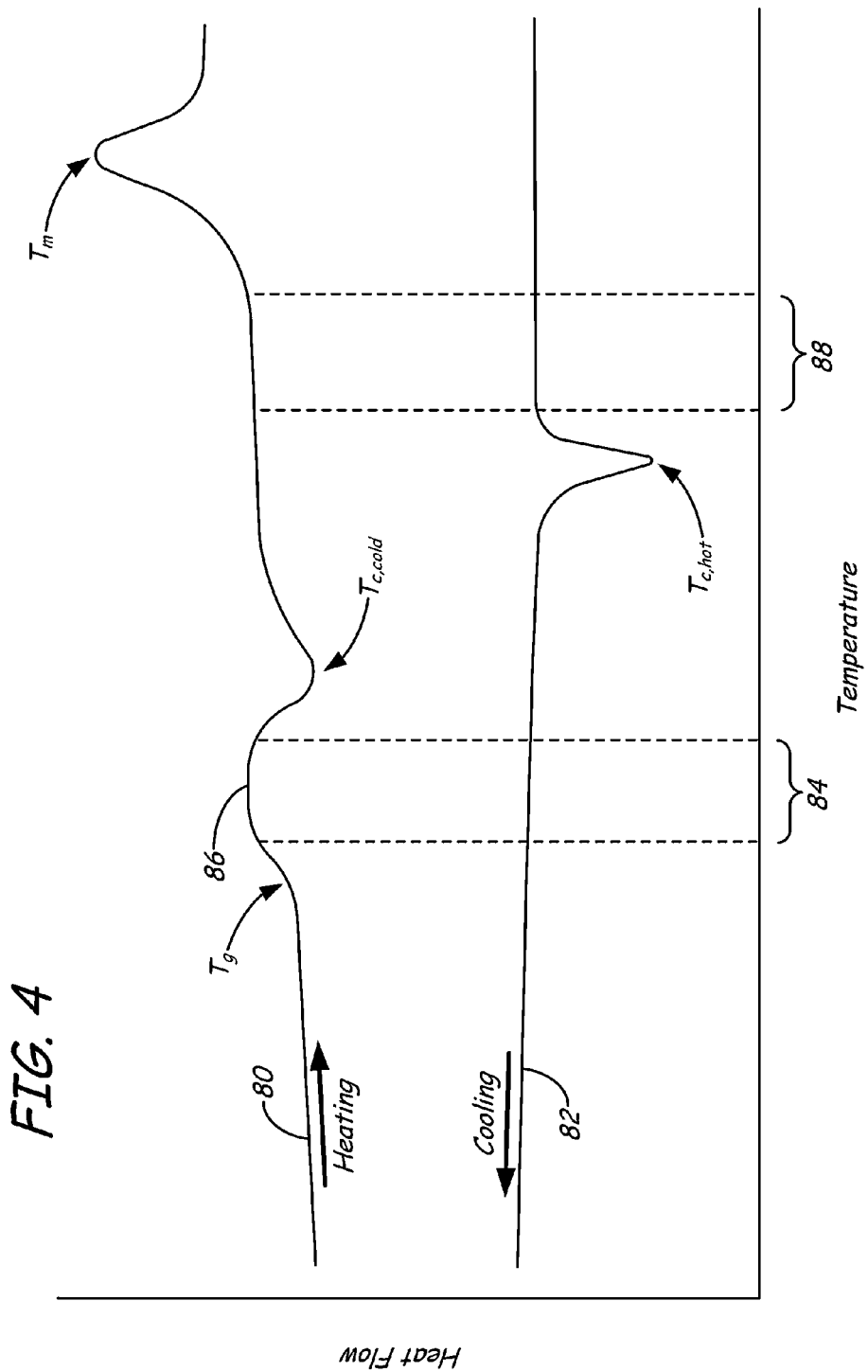
FIG. 4 is an illustrative differential scanning calorimetry (DSC) plot of heat flow versus temperature for a part material.

FIG. 4 illustrates a DSC plot for an exemplary part material of the present disclosure having a substantially miscible blend of one or more semi-crystalline polymers and one or more amorphous polymers. The DSC pot in FIG. 4 shows the various thermal transitions that the part material may exhibit. For example, during an initial heating phase, such as when the part material is melted in liquefier assembly 44, the part material may produce a heating profile 80 with a glass transition temperature ($T_g$), a cold crystallization temperature ($T_{c,cold}$), and a melting temperature ($T_m$). The glass transition temperature ($T_g$) refers to the point along curve 80 where the part material undergoes a second-order transition to achieve an increase in its heat capacity.

In some embodiments, the semi-crystalline copolymer or blend may consist essentially of semi-crystalline polymers that exhibit substantial or complete miscibility. This may be the case for closely related polymers that are synthesized using (i) one or more base monomers, and (ii) a sizable fraction of one or more monomers that are structural or optical isomers of the base monomer(s) usually used in the synthesis. Other options include additional, unrelated monomers added in sufficient amounts to substantially alter the glass transition temperature, crystallization temperatures, re-crystallization temperatures, melting points, and/or enthalpies of fusion, as measured during heating or cooling at a specified, constant rate.

Examples of some suitable techniques for these embodiments include controlling the level of d-lactide and l-lactide incorporated into a final polylactic acid polymer to achieve a poly-DL-lactide. The DL polylactic acid copolymer has slower crystallization kinetics and may even exhibit characteristics of a completely amorphous polymer.

Another useful example includes polyetherketoneketone (PEKK). Crystallinity, melting, point, enthalpy of fusion, crystallization rate, and even glass transition temperature have been seen to drop as the ratio of terephthalic moieties-to-isophtalic moieties in the copolymer backbone increases. In PEKK, an observed range from highly crystalline to practically amorphous behavior is observed in terephthalic-to-isophtalic moiety ratios from about 80/20 to about 60/40.

A third useful example includes the synthesis of polyesters, specifically those based on a poly(ethyleneterephthalate) polymer. In this case, some isophthalic moeities may be used in place of a terephthalic moeities to impart similar adjustments in crystallinity and crystallization behavior as discussed above for PEKK. Additionally, one or more glycols may be exchanged with one or more ethylene glycols, propylene glycols, and/or butylene glycols, such as cyclohexanedimethanol, for example, to achieve similar effects.

The cold crystallization temperature $T_{c,cold}$ typically occurs due to the increased mobility of the polymer molecules after exceeding the glass transition temperature $T_g$, which allows a portion of the semi-crystalline polymer(s) to form crystalline regions. Because the crystallization is an exothermic process, it releases thermal energy based on a first-order transition, as illustrated by the inverted peak in heating profile 80.

The melting temperature $T_m$ is the temperature at which the part material fully liquefies, also based on a first-order transition. Typically, the part material is quickly heated past its melting temperature $T_m$ in liquefier assembly 44 for extrusion. As such, during this point in the process, the glass transition temperature $T_g$ and the cold crystallization temperature $T_{c,cold}$ are not overly relevant to the crystallization state of the extrudate, other than for potential melt flow and temperature control aspects in liquefier assembly 44.

The DSC plot in FIG. 4 also includes a cooling profile 82, which illustrates hot crystallization temperature $T_{c,hot}$, and describes the crystallization kinetics of the part material as it cools down from its melting temperature $T_m$. For example, after being extruded from nozzle 48, the extruded part material may deposit as roads onto the previously-formed layer of 3D part 30, and begin cooling down. In other words, the part material begins to follow cooling profile 82 at a cooling rate that depends on the environment temperature that 3D part 30 is printed in (e.g. in chamber 12), as well as the particular composition of the part material and the size of 3D part 30.

Preferably, the layers of 3D part 30 are printed in chamber 12 (or at least in a locally-heated deposition region) that is maintained at a temperature between a solidification temperature and the cold crystallization temperature $T_{c,cold}$ of the part material. This can anneal the successively-printed printed layers, allowing them to cool down and solidify slowly, which can partially relieve the residual stresses.

In some embodiments, chamber 12 or the locally-heated deposition region is maintained at a temperature between a solidification temperature and the glass transition temperature $T_g$ of the part material. These embodiments are suitable for part materials having low levels of crystalline regions, where the crystalline regions are not capable of supporting the printed layers at higher temperatures without slumping.

Alternatively, in other embodiments, chamber 12 or the locally-heated deposition region is maintained at a temperature within an annealing window 84 having a lower limit at about the glass transition temperature $T_g$ of the part material and an upper limit that is less than the cold crystallization temperature $T_{c,cold}$ of the part material. In particular, annealing window 84 preferably encompasses the plateau region 86 of DSC heating curve 80, which is above the increased slope for the glass transition temperature $T_g$ and below the decreased slope for the cold crystallization temperature $T_{c,cold}$. These embodiments are suitable for part materials having enough crystalline regions to support the printed layers without slumping, despite being held above the glass transition temperature $T_g$ of the part material.

In further embodiments, such as for use with low-temperature materials (e.g., those with glass transition temperatures near ambient temperatures), chamber 12 may be omitted, and the part material may be printed at room temperature (e.g., 25° C.). Regardless of the annealing temperature, it has been found that the substantially-miscible blends for the part material modify the glass transition temperature $T_g$ of the part material from that of the amorphous polymer(s), typically flowing the Flory-Fox Equation. The substantially-miscible blends may also decrease the hot crystallization temperature $T_{c,hot}$ of the part material from that of the pure semi-crystalline polymer(s). This provides a unique advantage in that the cumulative amount of crystallization for the part material upon cooling can be reduced, which accordingly allows the printed layers of the part material to have low levels of crystallinity.

In particular, upon being extruded and deposited from nozzle 48, the part material preferably is quickly cooled down past its hot crystallization temperature $T_{c,hot}$ to its annealing temperature below the cold crystallization temperature $T_{c,cold}$ of the part material (e.g., within annealing window 84). This effectively supercools the part material down below its cold crystallization temperature $T_{c,cold}$.

It has been found that the level of crystallinity can be controlled based on the particular annealing temperature used. For instance, if more amorphous properties are desired, the annealing temperature may be set to be set within about 5° C. of the glass transition temperature $T_g$ of the part material. Alternatively, if more crystalline properties are desired, the annealing temperature may be set to be set within 5° C. of the cold crystallization temperature $T_{c,cold}$ of the part material. Furthermore, any intermediate amorphous-crystalline variation may be achieved by maintaining the annealing temperature at a selected temperature within annealing window 84.

The incorporation of the amorphous polymer(s) also assists in physically impeding the semi-crystalline polymer(s) from grouping together in ordered arrangements to form crystalline regions. As such, as the part material quickly cools down from its melting temperature $T_m$, the short residence time in the region between its hot crystallization temperature $T_{c,hot}$ and its cold crystallization temperature $T_{c,cold}$, combined with the crystallization impedance, preferably minimizes or otherwise reduces the formation of crystalline regions in the part material.

For instance, if a given pure semi-crystalline polymer (i.e., non-blend) is capable of crystallizing to its fullest extent in about 3 seconds in the region between its hot crystallization temperature $T_{c,hot}$ and its cold crystallization temperature $T_{c,cold}$, and if it quickly cools down such that it resides in this region for about one second, it may form about one-third of is achievable of crystalline regions. In comparison, the crystallization impedance of the part material blend may require more than a 10 to 20-fold increase in the time required to fully crystallize. As such, when the part material resides in this region between its hot crystallization temperature $T_{c,hot}$ and its cold crystallization temperature $T_{c,cold}$ for about one second, it may only form about 1-3% of its fully-achievable crystallinity, for example. In fact, it has been observed that the supercooled part material exhibits a translucent, substantially non-opaque appearance. This is an indication that crystallinity has been significantly retarded since crystalline regions typically modify the indices of refraction of the extruded layers to render them opaque.

The minimized or reduced crystallization correspondingly reduces the discontinuous changes in volume of the semi-crystalline polymer(s), thereby reducing the residual stresses on the printed layers. Furthermore, holding the printed layers at the annealing temperature (e.g., within annealing window 84) also anneals the successively-printed printed layers, allowing them to cool down and solidify slowly, which can relieve the residual stresses typically associated with amorphous materials.

In other words, the part material is preferably supercooled quickly from its extrusion temperatures down to an annealing temperature in annealing window 84, and then held within annealing window 84 for a suitable duration to relieve the residual stresses. After that, the printed layers of the part material may be cooled down further (e.g., below its glass transition temperature $T_g$ and/or its solidification temperature).

Another interesting property of the part materials of the present disclosure is that, despite the minimized or reduced crystallinity, the crystallization that does occur during the supercooling generates a sufficient amount of heat to induce extra or increased molecular reptation at the extrudate-part interface. In other words, the heat produced during the limited crystallization-exothermic reaction allows the polymer molecules at the extrudate-part interface to move and become highly entangled. It has been observed that, due to the heat of fusion of the extruded roads, the rate of temperature decay of the extruded part material can change, and cool down at a slower rate. For example, in an interior raster pattern, this can result in an interfacial temperature boost, causing better reptation in the X-Y build plane, as long as the rastered roads contact each other before the extruded part material cools down to the annealing temperature in chamber 12. This accordingly increases the strength of the printed 3D part 30 in both the intra-layer x-y directions, and also in the interlayer z-direction. As a result, 3D part 30 may have mechanical properties (e.g., strengths and ductilities) similar to those of semi-crystalline polymer(s).

Once the printing operation is completed, 3D part 30 may then be cooled down to room temperature and optionally undergo one or more post-printing processes. Alternatively, 3D part 30 may be reheated in a post-printing crystallization step. In this step, 3D part 30 may be heated up to about its cold crystallization temperature $T_{c,cold}$ for a sufficient duration to induce further crystallization of the semi-crystalline polymer(s). Examples of suitable annealing durations in the post-printing crystallization step range from about 30 minutes to 3 hours, and may vary depending on the dimensions of each 3D part 30 and the part material compositions. Correspondingly, examples of suitable annealing temperatures in the post-printing crystallization step range from about the cold crystallization temperature $T_{c,cold}$ of the part material to within about 10° C. above its cold crystallization temperature $T_{c,cold}$, and more preferably to within about 5° C. above its cold crystallization temperature $T_{c,cold}$.

The post-printing crystallization step can further increase the mechanical, thermal, and chemical resistance properties of 3D part 30 due to the increased formation of the crystalline regions. Additionally, this post-printing crystallization step is performed on 3D part 30 as a whole (i.e., congruent crystallization), rather than as the layers are individually printed. As such, any potential shrinkage on 3D part 30 from the formation of the crystalline regions occurs in a uniform manner similar to the effects in an injection molding process, rather than in a layer-by-layer manner that can otherwise result in curling effects. Another important feature with the post-printing crystallization step is that 3D part 30 is preferably de-coupled from platen 14 (e.g., from a build sheet of platen 14), allowing 3D part 30 to be further crystallized without being restricted by any non-shrinkable build sheet.

As mentioned above, a 3D part 30 having a translucent, substantially non-opaque appearance is an indication that crystallinity has been retarded during the printing operation. Similarly, the transformation from the translucent, substantially non-opaque appearance to an opaque appearance is an indication that the part material of 3D part 30 has undergone significant crystallization in the post-printing crystallization step. After the post-printing crystallization step is completed, the resulting 3D part 30 may then be cooled down to room temperature and optionally undergo one or more post-printing processes.

The post-printing crystallization step may be performed in chamber 12 of system 10, or alternatively in a separate annealing oven. A separate annealing oven may be preferred in many situations, such as when support structure 32 needs to be removed prior to the post-printing annealing step and/or when system 10 needs to be used for subsequent printing operations. For example, a printing farm of multiple systems 10 may operate in coordination with one or more separate annealing ovens to maximize the duty cycles of the systems 10.

The above-discussed control of the crystallization kinetics of the part material requires the part material to have a blend of one or more semi-crystalline polymers and one or more secondary materials, preferably amorphous polymer(s), that retard crystallization of the semi-crystalline polymer(s) and that are at least partially miscible (or more preferably, substantially miscible) with the semi-crystalline polymer(s).

Preferably the semi-crystalline polymer(s) and the secondary material(s) in the blend are separate compounds (e.g., separate polymers) that are homogenously blended. However, in alternative (or additional) embodiments, part material may include one or more copolymers having chain segments corresponding to the semi-crystalline polymer(s) and the secondary material(s), where the chain segments of the secondary material(s) retard the crystallization of the chain segments of the semi-crystalline polymeric material(s).

In a first embodiment, the part material is a polyamide part material that compositionally includes a polyamide blend of one or more semi-crystalline polyamides, one or more amorphous polyamides, and optionally, one or more additives dispersed in the polyamide blend. The semi-crystalline polyamide(s) may include polyamide homopolymers and copolymers derived from monomers that include caprolactam, diamines in combination with monomers that include dicarboxylic acids, and mixtures thereof. The diamine monomers and the dicarboxylic acid monomers are each preferably aliphatic monomers, and more preferably are each acyclic aliphatic monomers.

However, in other embodiments, the diamine monomers and/or the dicarboxylic acid monomers may include aromatic or cycloaliphatic groups while maintaining crystalline domains. Furthermore, in some embodiments, the semi-crystalline polyamide(s) may include cyclic groups in grafted pendant chains (e.g., maleated groups), as discussed below. Preferred polyamide homopolymers and copolymers for the semi-crystalline polyamide(s) may be represented by the following structural formulas:

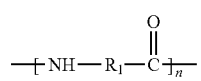

(Formula 1)

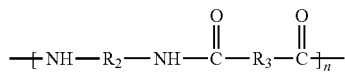

(Formula 2)

where $R_1$, $R_2$, and $R_3$ may each be a hydrocarbon chain having 3-12 carbon atoms. The hydrocarbon chains for $R_1$, $R_2$, and $R_3$ may be branched (e.g., having small alkyl groups, such as methyl groups) or unbranched, and which are preferably aliphatic, acyclic, saturated hydrocarbon chains.

As used herein, reference to a repeating unit identifier "n" in a polymer structural formula means that the bracketed formula repeats for n units, where n is a whole number that may vary depending on the molecular weight of the given polymer. Furthermore, the particular structures of the bracketed formulas may be the same between the repeating units (i.e., a homopolymer) or may be vary between the repeating units (i.e., copolymer). For example, in the above-shown Formula 1, $R_1$ may be the same structure for each repeating unit to provide a homopolymer, or may be two or more different structures that repeat in an alternating copolymer manner, a random copolymer manner, a block copolymer manner, a graft copolymer manner (as discussed below), or combinations thereof.

Preferred polyamides for the semi-crystalline polyamide(s) include nylon-type materials such as polycarpolactum (PA6), polyhexamethyleneaidpamide (PA6,6), polyhexamethylenenonamide (PA6,9), polyhexamethylenesebacamide (PA6,10), polyenantholactum (PA7), polyundecanolactum (PA11), polylaurolactam (PA12), and mixtures thereof. More preferably, the polyamides for the semi-crystalline polyamide(s) include PA6; PA6,6; and mixtures thereof. Examples of suitable semi-crystalline polyamide(s) having aromatic groups include semi-crystalline polyamides of aliphatic diamines and isophthalic acid and/or terephthalic acid (e.g., semi-crystalline polyphthalamides).

Furthermore, in some embodiments, at least a portion of the semi-crystalline polyamide(s) are graft semi-crystalline polyamide(s), each having a polyamide backbone and one or more impact modifiers grafted to the backbone. The impact modifiers may include polyolefin-chain monomers and/or elastomers having coupling groups configured to graft the monomers to the polyamide backbone. Suitable coupling groups for the impact modifiers include piperidine groups, acrylic/methacrylic acid groups, maleic anhydride groups, epoxy groups.

Preferred coupling groups include maleic anhydride groups and epoxy groups, such as those respectively represented by the following structural formulas:

where $R_4$ and $R_5$ may each be a hydrocarbon chain having 2-20 carbon atoms, and more preferably 2-10 carbon atoms; and where $R_6$ may be a hydrocarbon chain having 1-4 carbon atoms. The hydrocarbon chains of $R_4$, $R_5$, and R6 may each be branched or unbranched. For example, preferred impact modifiers include maleated polyethylenes, maleated polypropylenes, and mixtures thereof. In embodiments in which the impact modifier includes an elastomer, preferred impact modifiers include maleated ethylene propylene diene monomers (EPDM).

Examples of suitable commercial impact modifiers include those available under the tradenames LOTADER from Arkema Inc., Philadelphia, Pa.; those under the tradename ELVALOY PTW, FUSABOND N Series, and NUCREL from E. I. du Pont de Nemours and Company, Wilmington, Del.; and those under the tradename ROYALTUF from Chemtura Corporation, Philadelphia, Pa. Examples of preferred graft semi-crystalline polyamides include those commercially available under the tradename ULTRAMID from BASF Corporation, Florham Park, N.J.; and those under the tradename GRILAMID from EMS-Chemie, Inc., Sumter, S.C. (business unit of EMS-Grivory).

The grafted impact modifiers may constitute from about 1% to about 20% by weight of the graft semi-crystalline polyamide(s). In some embodiments, the grafted impact modifiers constitute from about 5% to about 15% by weight of the graft semi-crystalline polyamide(s). In embodiments that incorporate the graft semi-crystalline polyamide(s), the graft semi-crystalline polyamide(s) may constitute from about 50% to 100% by weight of the semi-crystalline polyamide(s) in the part material, more preferably from about 80% to 100% by weight, and even more preferably from about 95% to 100% by weight. In some preferred embodiments, the semi-crystalline polyamide(s) of the PA material consist essentially of the graft semi-crystalline polyamide(s).

The semi-crystalline polyamide(s) preferably have a molecular weight range that renders them suitable for extrusion from print head 18, which may be characterized by their melt flow indices. Preferred melt flow indices for the semi-crystalline polyamide(s) range from about 1 gram/10 minutes to about 40 grams/10 minutes, more preferably from about 3 grams/10 minutes to about 20 grams/10 minutes, and even more preferably from about 5 grams/10 minutes to about 10 grams/10 minutes where the melt flow index, as used herein, is measured pursuant to ASTM D1238-10 with a 2.16 kilogram weight at a temperature of 260° C.

The PA material also compositionally includes one or more amorphous polyamides that are preferably miscible with the semi-crystalline polyamide(s). The amorphous polyamide(s) may include polyamide homopolymers and copolymers derived from monomers that include diamines in combination with monomers that include dicarboxylic acids, which are preferably cycloaliphatic and/or aromatic monomers. However, in other embodiments, the diamine monomers and/or the dicarboxylic acid monomers may include aliphatic groups (e.g., acyclic aliphatic groups) while maintaining amorphous properties.

Preferred polyamide homopolymers and copolymers for the amorphous polyamide(s) may be represented by the following structural formulas:

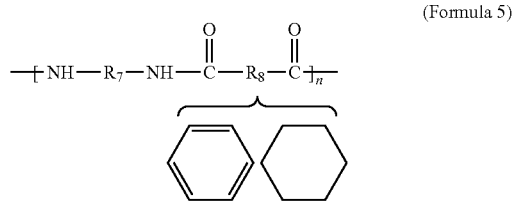
(Formula 5)

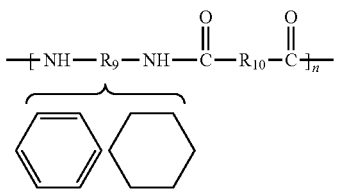
(Formula 6)

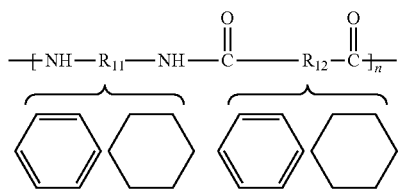
(Formula 7)

where $R_7$ and $R_{10}$ may each be a hydrocarbon chain having 3-12 carbon atoms. The hydrocarbon chains for $R_7$ and $R_{10}$ may be branched (e.g., having small alkyl groups, such as methyl groups) or unbranched, and which are preferably aliphatic, acyclic, saturated hydrocarbon chains. In comparison, $R_8$, $R_9$, $R_{11}$, and $R_{12}$ may each be a hydrocarbon chain having 5-20 carbon atoms, which may be branched (e.g., having alkyl groups, such as methyl groups) or unbranched, and each of which includes one or more aromatic groups (e.g., benzene groups), one or more cycloaliphatic groups (e.g., cyclohexane groups), or combinations thereof.

Preferred polyamides for the amorphous polyamide(s) include nylon-type materials such as polyamides of hexamethylenediamine, isophthalic acid, terephthalic acid, and adipic acid (PA6i/6T); polyamides of PA2; 3,3-dimethyl-4,4-diaminodicyclohexylmethane, and isophthalic acid (PA12/MACMI); polyamides of PA12; 3,3-dimethyl-4,4-diaminodicyclohexylmethane, and terephthalic acid (PA12/MACMT); (PA12/MACMI/MACMT); PA6i; PA12/MACM36; PANDT/INDT; polyamides of trimethylhexamethylenediamine and terephthalic acid (PA6/3T); polyamides of cycloaliphaticdiamine and dodecanedioic acid; amorphous polyamides of aliphatic diamines and isophthalic acid and/or terephthalic acid (e.g., amorphous polyphthalamides); and mixtures thereof. More preferably, the polyamides for the amorphous polyamide(s) include PA6/3T, polyamides of cycloaliphaticdiamine and dodecanedioic acid, and mixtures thereof.

In some embodiments, at least a portion of the amorphous polyamide(s) may be graft amorphous polyamide(s), each having a polyamide backbone and one or more impact modifiers grafted to the backbone. Preferred impact modifiers for grafting to the amorphous polyamide(s) include those discussed above for the graft semi-crystalline polyamide(s), such as polyolefin-chain monomers and/or elastomers having coupling groups configured to graft the monomers to the polyamide backbone (e.g., piperidine groups, acrylic/methacrylic acid groups, maleic anhydride groups, and epoxy groups). Suitable concentrations of the grafted impact modifiers in the graft amorphous polyamide(s), and suitable concentrations of the graft amorphous polyamides relative to the entirety of amorphous polyamide(s) in the part material include those discussed above for the graft semi-crystalline polyamide(s).

Preferred concentrations of the amorphous polyamide(s) in the polyamide blend range from about 30% to about 70% by weight, more preferably from about 40% to about 60% by weight, and even more preferably from about 45% to about 55% by weight, where the semi-crystalline polyamide(s) constitute the remainder of the polyamide blend. Accordingly, preferred ratios of the amorphous polyamide(s) to the semi-crystalline polyamide(s) range from about 3:7 to about 7:3, more preferably from about 4:6 to about 6:4, and even more preferably from about 4.5:5.5: to about 5.5:4.5.

In a second embodiment, the part material includes a substantially miscible blend of one or more polyetherimides (PEI) and one or more semi-crystalline polyaryletherketones (PAEK), such as one or more polyetherketones (PEK), polyetheretherketones (PEEK), polyetherketoneketones (PEKK), polyetheretherketoneketones (PEEKK), polyetherketoneether-ketoneketones (PEKEKK), mixtures thereof, and the like, and more preferably one or more polyetheretherketones (PEEK). Preferred concentrations of the polyaryletherketone(s) in this blend range from about 35% by weight to about 99% by weight, and more preferably from about 50% by weight to about 90% by weight, and even more preferably form about 60% by weight to about 80% by weight, where the polyetherimide(s) constitute the remainder of the blend.

In a third embodiment, the part material includes a substantially miscible blend of one or more polyphenylsulfones (PPSU), polysulfones (PSU), and/or polyethersulfones (PES), with one or more semi-crystalline polyaryletherketones. Preferred concentrations of the polyphenylsulfone(s)/polysulfone(s)/polyethersulfone(s) in this blend range from about 1% by weight to about 65% by weight, and more preferably from about 20% by weight to about 50% by weight, where the polyaryletherketone(s) constitute the remainder of the blend.

In a fourth embodiment, the part material includes a substantially miscible blend of one or more polycarbonates and one or more semi-crystalline polybutylene terephthalates (PBT) and/or one or more semi-crystalline polyethylene terephthalates (PET). Preferred concentrations of the polycarbonate(s) in this blend range from about 30% by weight to about 90% by weight, and more preferably from about 50% by weight to about 70% by weight, where the polybutylene terephthalate(s)/polyethylene terephthalate(s) constitute the remainder of the blend.

In a fifth embodiment, the part material includes a substantially miscible blend of one or more amorphous polyethylene terephthalates (e.g., glycol-modified polyethylene terephthalates) and one or more semi-crystalline polyethylene terephthalates. Preferred concentrations of the amorphous polyethylene terephthalate(s) in this blend range from about 10% by weight to about 40% by weight, and more preferably from about 15% by weight to about 25% by weight, where the semi-crystalline polyethylene terephthalate(s) constitute the remainder of the blend.

In a sixth embodiment, the part material includes a substantially miscible blend of one or more amorphous polyaryletherketones and one or more semi-crystalline polyaryletherketones, such as one or more amorphous polyetherketoneketones (PEKK) and one or more semi-crystalline polyetherketoneketones (PEKK). Preferred concentrations of the amorphous polyaryletherketones(s) in this blend range from about 30% by weight to about 90% by weight, and more preferably from about 50% by weight to about 70% by weight, where the semi-crystalline polyaryletherketones(s) constitute the remainder of the blend.

In some embodiments, the part material may also include additional additives, such as colorants, fillers, plasticizers, impact modifiers, and combinations thereof. In embodiments that include colorants, preferred concentrations of the colorants in the part material range from about 0.1% to about 5% by weight. Suitable colorants include titanium dioxide, barium sulfate, carbon black, and iron oxide, and may also include organic dyes and pigments.

In embodiments that include fillers, preferred concentrations of the fillers in the part material range from about 1% to about 45% by weight for some fillers (e.g., glass and carbon fillers), and up to about 80% by weight for other fillers, such as metallic and ceramic fillers. Suitable fillers include calcium carbonate, magnesium carbonate, glass spheres, graphite, carbon black, carbon fiber, glass fiber, talc, wollastonite, mica, alumina, silica, kaolin, silicon carbide, zirconium tungstate, soluble salts, metals, ceramics, and combinations thereof.

In the embodiments including the above-discussed additional additives, the polymer blend preferably constitutes the remainder of the part material. As such, the polymer blend may constitute from about 55% to 100% by weight of the part material, and more preferably from about 75% to 100% by weight. In some embodiments, the polymer blend constitutes from about 90% to 100% by weight of the part material, more preferably from about 95% to 100% by weight. In further embodiments, the part material consists essentially of the polymer blend, and optionally, one or more colorants and/or anti-oxidants.

Preferably, the polymer blend is also substantially homogenous, allowing each portion of the part material used in an additive manufacturing system to consistently exhibit the same thermal and physical properties. For example, with system 10 having print head 18, the flow rate of the molten part material (i.e., melt 70) from nozzle 48 is controlled by the rate at which filament 52 enters liquefier tube 56, and the melting rate of filament 52 within heating zone 68. System 10 may operate with preset instructions for extruding melt 70 at desired flow rates based on tool path geometries. These preset instructions are preferably based on the thermal properties of the part material, namely the melting rate and viscosity of the part material, as well as the crystallization kinetics of the part material.

As such, if the polymer blend were otherwise non-homogenous, the part material would not be uniform. This could cause successive segments of filament 52 to melt at different rates, affecting the height of meniscus 74. This accordingly can change the extrusion rate of melt 70 from the preset instructions, which can impair part quality in 3D part 30. Additionally, a non-homogenous blend may result in imbalances in the crystallization kinetics of the part material, which could reduce the above-discussed benefits of controlling the crystallization kinetics. Accordingly, filament 52 is preferably manufactured from a part material having a substantially homogenous polymer blend of the semi-crystalline polymer(s) and the secondary material(s) (e.g., amorphous polymer(s)). In embodiments that include one or more additives, the additive(s) are preferably dispersed in the polymer blend in a substantially uniform manner.

As mentioned above, the above-discussed method may also be utilized with electrophotography-based additive manufacturing systems and selective laser sintering systems. With respect to electrophotography-based additive manufacturing systems, the part material may be provided in powder form for use in an electrophotography-based additive manufacturing system, such as those disclosed in Hanson et al., U.S. Publication Nos. 2013/0077996 and 2013/0077997, and Comb et al., U.S. Publication Nos. 2013/0186549 and 2013/0186558, the disclosures of which are incorporated by reference to the extent that they do not conflict with the present disclosure.

As discussed in these references, the electrophotography-based additive manufacturing systems preferably operate with layer transfusion assemblies that transfuse each successively-developed layer based on interlayer polymer entanglement (i.e., reptation). As such, the above-discussed method for controlling the crystallization kinetics of the part material for the extrusion-based additive manufacturing systems may also be used in the same manner with the electrophotography-based additive manufacturing systems.

In comparison, however, selective laser sintering systems may print 3D parts from nylon materials in a manner in which a nylon material is held in a gelatinous, undercooled amorphous state between the melting temperature and the hot crystallization temperature of the nylon material. However, nylon materials typically have small temperature windows between their melting temperatures and the hot crystallization temperatures, rendering it difficult to hold the printed layers in this amorphous state after being melted with a laser beam.

However, as discussed above, it has been found that the substantially miscible blends for the part material of the present disclosure decrease the hot crystallization temperature $T_{c,hot}$ of the part material from that of the semi-crystalline polymer(s). Conversely, the melting temperature $T_m$ of the part material remains substantially unchanged. As such, the substantially miscible blend for the part material widens the operating window, referred to as operating window 88 in FIG. 4, in which the printed layers may be held in the gelatinous, undercooled amorphous state to prevent warping and distortions. In this case, the powder materials may be selectively melted with the laser beam and held within this operating window 88 until the printing operation is completed. The whole 3D part 30 may then be cooled down in a conventional manner.

In embodiments involving the above-discussed technique used in a selective laser sintering system (e.g., systems disclosed in Deckard, U.S. Pat. Nos. 4,863,538 and 5,132,143), the part material may be provided in powder form for use in other powder-based additive manufacturing systems. In some alternative embodiments, such as with some polyamide materials (e.g., glass-filled PA6/10 materials), this technique may also be utilized in extrusion-based and/or electrophotography-based additive manufacturing systems. This can accordingly produce 3D parts having high heat deflection temperatures, which can be beneficial for use with soluble support materials.

EXAMPLES

The present disclosure is more particularly described in the following examples that are intended as illustrations only, since numerous modifications and variations within the scope of the present disclosure will be apparent to those skilled in the art. Unless otherwise noted, all parts, percentages, and ratios reported in the following examples are on a weight basis, and all reagents used in the examples were obtained, or are available, from the chemical suppliers described below, or may be synthesized by conventional techniques.

I. Examples 1-4

Part materials of Examples 1-4 and Comparative Examples A and B were prepared as PEEK/PEI blends with varying weight ratios. Each part material was then analyzed using DSC to determine the glass transition temperature $T_g$, cold crystallization temperature $T_{c,cold}$, melting temperature $T_m$, and hot crystallization temperature $T_{c,hot}$. Table 1 lists the DSC results for the tested part materials with the PEEK/PEI ratios, where the temperatures were reported in degrees Celsius.

TABLE 1

| Example | PEEK/PEI Weight Ratio | $T_g$ | $T_{c,cold}$ (peak) | $T_m$ (peak) | $T_{c,hot}$ (peak) |
|---|---|---|---|---|---|
| Comparative Example A | 100/0 | 146 | — | 346 | 303 |
| Example 1 | 85/15 | 160 | 207 | 341 | 288 |
| Example 2 | 70/30 | 179 | 249 | 338 | 265 |
| Example 3 | 55/44 | 181 | 265 | 337 | 266 |
| Example 4 | 35/65 | 191 | — | 338 | — |
| Comparative Example B | 0/100 | 214 | — | — | — |

The results in Table 1 show the relative changes in the glass transition temperature $T_g$, cold crystallization temperature $T_{c,cold}$, melting temperature $T_m$, and hot crystallization temperature $T_{c,hot}$ for the different PEEK/PEI ratios. For example, the glass transition temperature $T_g$ increases substantially with the increased concentration of PEI. Furthermore, the cold crystallization temperature $T_{c,cold}$ and the hot crystallization temperature $T_{c,hot}$ converged closer together with the increased concentration of PEI, but the melting temperature $T_m$ remained relatively the same (e.g., 4 degree drop between Examples 1 and 3, versus a 22 degree drop for the hot crystallization temperature $T_{c,hot}$).

Accordingly, the differences between the glass transition temperatures $T_g$ and the cold crystallization temperatures $T_{c,cold}$ for Examples 1-3 provide suitable annealing windows (e.g., annealing window 84) for printing 3D parts with extrusion-based and/or electrophotography-based additive manufacturing systems. Similarly, the differences between the melting temperatures $T_m$ and the hot crystallization temperature $T_{c,hot}$ for Examples 1-3 provide suitable operating windows (e.g., operating window 88) for printing 3D parts with selective laser sintering systems.

The DSC testing also involved reheating the part materials after the cooling step to simulate a post-printing crystallization step. During this reheating step, the part materials of Examples 2 and 3 each exhibited two different glass transition temperatures $T_g$. The part material of Example 2 had a first glass transition temperature of 164° C. and a second glass transition temperature of 209° C. The part material of Example 2 had a first glass transition temperature of 167° C. and a second glass transition temperature of 210° C. This phenomenon is believed to be caused by the PEEK and PEI polymers separating upon crystallization, such that the PEI was not incorporated in the PEEK crystalline regions.

The enthalpy of fusions at the hot crystallization temperature $T_{c,hot}$ for the part materials were also determined, as listed below in Table 2.

TABLE 2

| Example | PEEK/PEI Weight Ratio | Enthalpy of Fusion (Joules/gram) |
|---|---|---|
| Comparative Example A | 100/0 | 56 |
| Example 1 | 85/15 | 43 |
| Example 2 | 70/30 | 37 |
| Example 3 | 55/44 | 37 |
| Example 4 | 35/65 | 3 |
| Comparative Example B | 0/100 | — |

The results in Table 2 show that the part materials of Examples 1-3 exhibit high levels of exothermic energy upon crystallization. The part material of Example 4 appeared to generate very little crystallization. However, this is believed to be due to a kinetic phenomenon that would disappear with slower cooling. The part material of Example 4 exhibited a melting point (as shown above in Table 1) and turned opaque upon reheating (i.e., re-crystallization).

II. Example 5

A part material of Example 5 having a PEEK/PEI weight ratio of 60/40 was compounded into cylindrical filaments having an average diameter of about 0.07 inches and wound onto spools of consumable assemblies. For each run, the consumable assembly was loaded to an extrusion-based additive manufacturing system commercially available from Stratasys, Inc., Eden Prairie, Minn. under the trademarks "FDM" and "FORTUS 400mc". The filament was then fed from the consumable assembly to print head liquefier assembly of the system, melted, and extruded from print head nozzle to print 3D parts in a heated chamber maintained at 160° C. (i.e., below its glass transition temperatures $T_g$).

Figure 5:
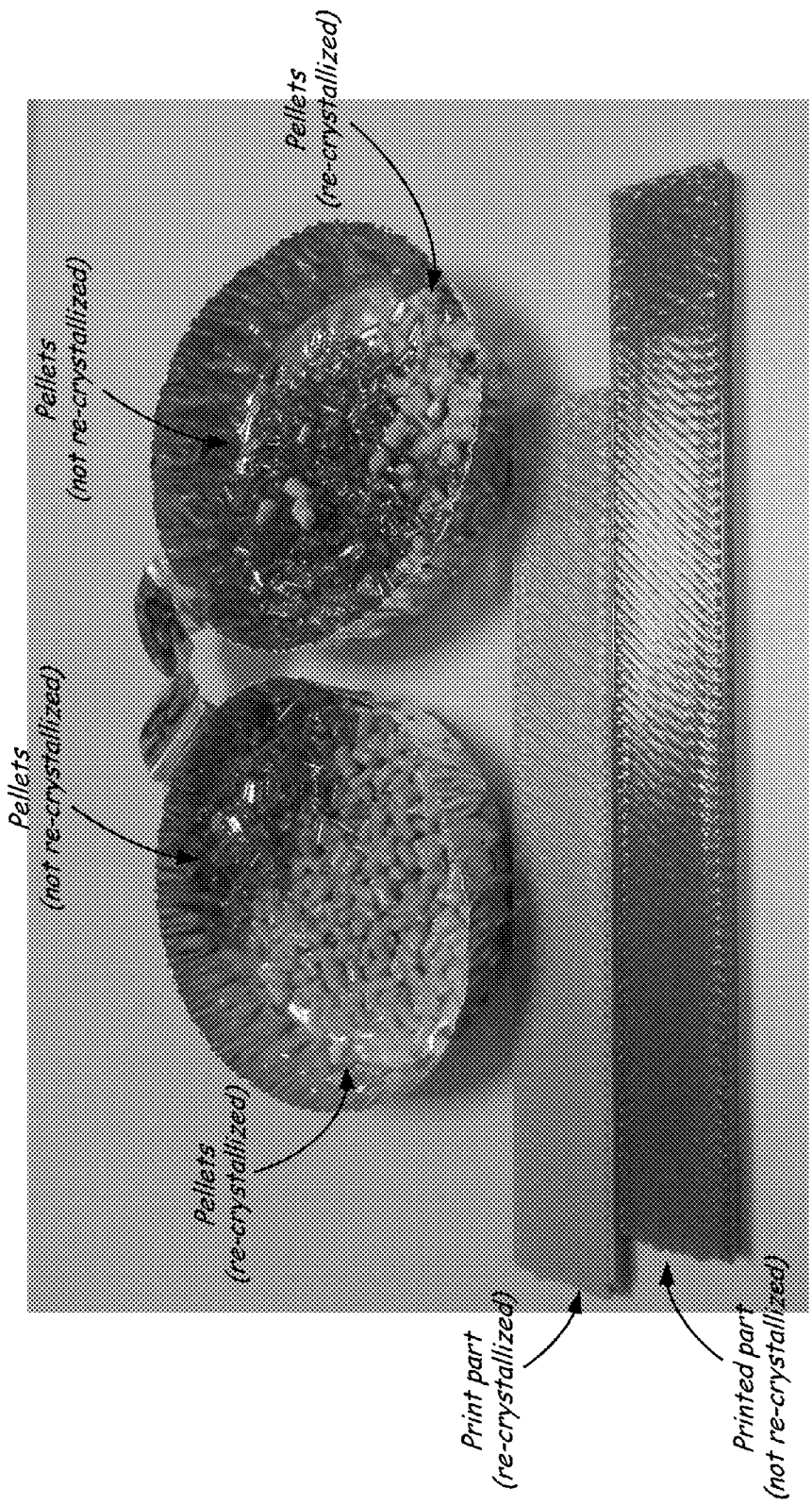
FIG. 5 is a photograph of printed 3D parts and pellets from a PEEK/PEI part material.

FIG. 5 illustrates pellets and the printed 3D parts from the part material of Example 5. The printed 3D part and associated pellets exhibited a golden, translucent appearance due to the low levels of crystallinity. A corresponding 3D part and portions of the pellets were also reheated to about 200° C. (i.e., a post-printing crystallization process) for a sufficient duration to re-crystallize the PEEK in the part material. As shown, the annealed 3D part and pellets each exhibited an opaque appearance, which was more tan/whitish in color than the golden color of the non-re-crystallized part/pellets.

III. Example 6

Part materials of Example 6 were prepared as polyamide blends, where the semi-crystalline polyamide was a graft PA12 polyamide commercially available under the tradename GRILAMID L16 from EMS-Chemie, Inc., Sumter, S.C. (business unit of EMS-Grivory), and the amorphous polyamide was a PA12 polyamide commercially available under the tradename GRILAMID TR90 from EMS-Chemie, Inc., Sumter, S.C. (business unit of EMS-Grivory).

For each part material of Example 6, the semi-crystalline polyamide concentration in the part material ranged from 27.2%-28.2% by weight, and the amorphous polyamide concentration in the part material ranged from 65.2%-66.2% by weight, for a blend ratio of about 70:30 of the amorphous polyamide to semi-crystalline polyamide. The part material also included an impact modifier having a concentration in the part material ranging from 4.5%-5.5% by weight, and an anti-oxidant having a concentration in the part material ranging from 0.03%-0.13% by weight.

Each part material of Example 6 was analyzed using DSC to provide an average glass transition temperature $T_g$ of 55° C., an average cold crystallization temperature $T_{c,cold}$ of 130° C., an average melting temperature $T_m$ of 178° C., and an average hot crystallization temperature $T_{c,hot}$ of 148° C. Each part material was also compounded into cylindrical filaments having an average diameter of about 0.07 inches and wound onto spools of consumable assemblies.

For each run, the consumable assembly was loaded to an extrusion-based additive manufacturing system commercially available from Stratasys, Inc., Eden Prairie, Minn. under the trademarks "FDM" and "FORTUS 400mc". The liquefier temperature was set to 355° C. and the heated chamber temperature was set to 80° C., 100° C., or 120° C., depending on the 3D part geometry being printed. Each 3D part exhibited good dimensional stability and low levels of crystallinity.

IV. Examples 7 and 8

A part materials of Example 7 was prepared as an impact-modified PET blend, where the semi-crystalline PET was a polyethylene terephthalate copolymer commercially available under the tradename "SKYPET BR" from SK Chemicals, South Korea, and the amorphous PET was a glycol-modified polyethylene terephthalate commercially available under the tradename "SKYGREEN S2008" from SK Chemicals, South Korea. The part material included 76% by weight of the semi-crystalline PET, 19% by weight of the amorphous PET, and 5% by weight of an impact modifier commercially available under the tradename "ELVALOY PTW" from E.I. du Pont de Nemours and Company, Wilmington, Del.

The part material of Example 7 was compounded into cylindrical filaments having an average diameter of about 0.07 inches and wound onto spools of consumable assemblies. For each run, the consumable assembly was loaded to an extrusion-based additive manufacturing system commercially available from Stratasys, Inc., Eden Prairie, Minn. under the trademarks "FDM" and "FORTUS 400mc".

During the printing operations, the filament was melted and extruded from a print head at a temperature of 320° C. into a heated build chamber, where the temperature of the build chamber was held at 90° C., 100° C., 110° C., and 120° C. for four different runs. The part material had a glass transition temperature of about 78° C. As such, these different temperatures tested how the different annealing windows affected the level of crystallinity in the resulting 3D part.

Figure 6:
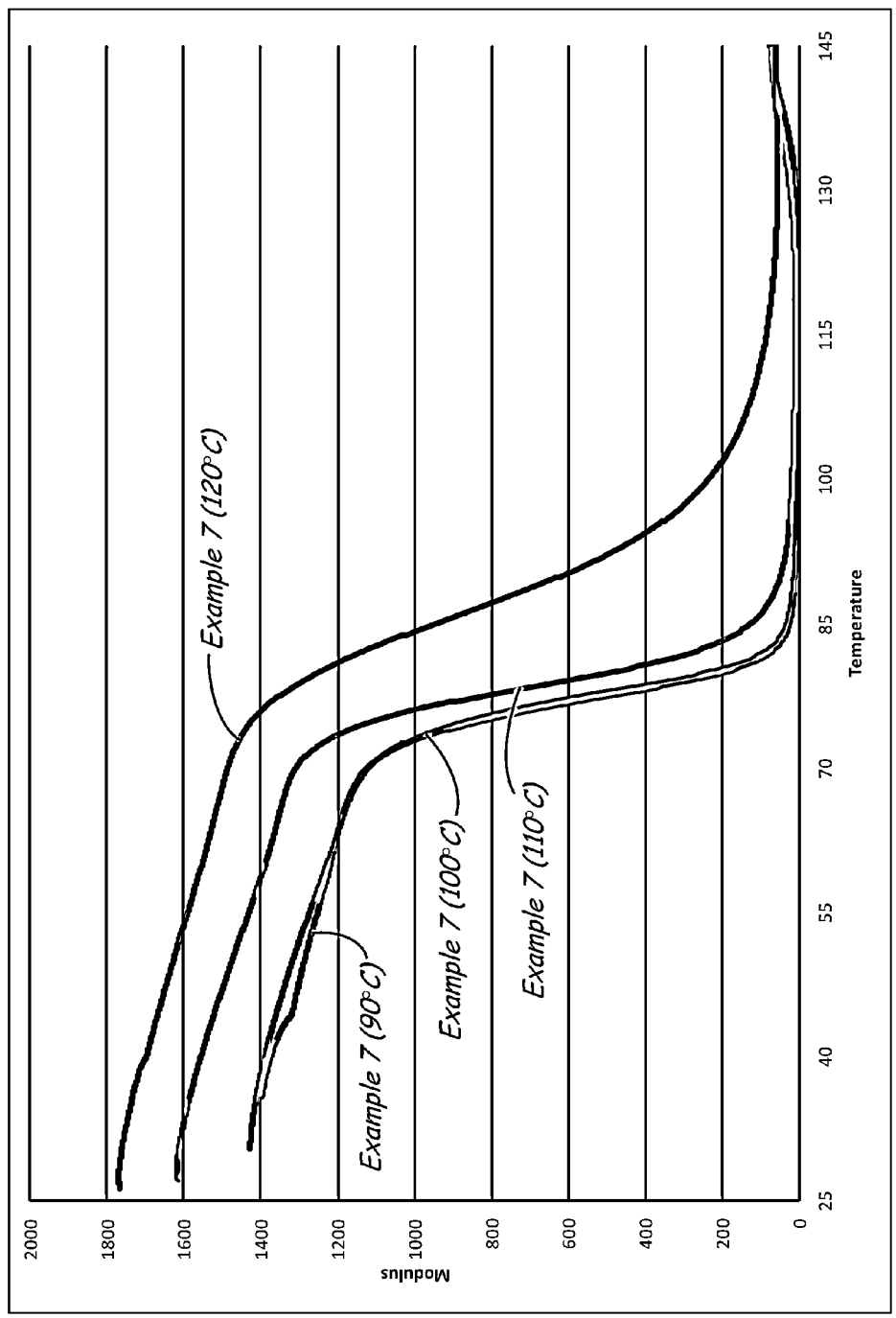
FIG. 6 is a graphical illustration of modulus versus temperature for example PET part materials printed in heated chambers having different annealing temperatures.

After being printed, each of the four 3D parts was slowly heated and the resulting modulus was measured, as illustrated in FIG. 6. As shown in FIG. 6, the part material annealed at 90° C. maintained a mostly-amorphous mechanical behavior, while the part material annealed at 120° C. maintained a mostly-semi-crystalline mechanical behavior. The part materials annealed at 100° C. and 110° C. fell between these two end points.

Figure 7:
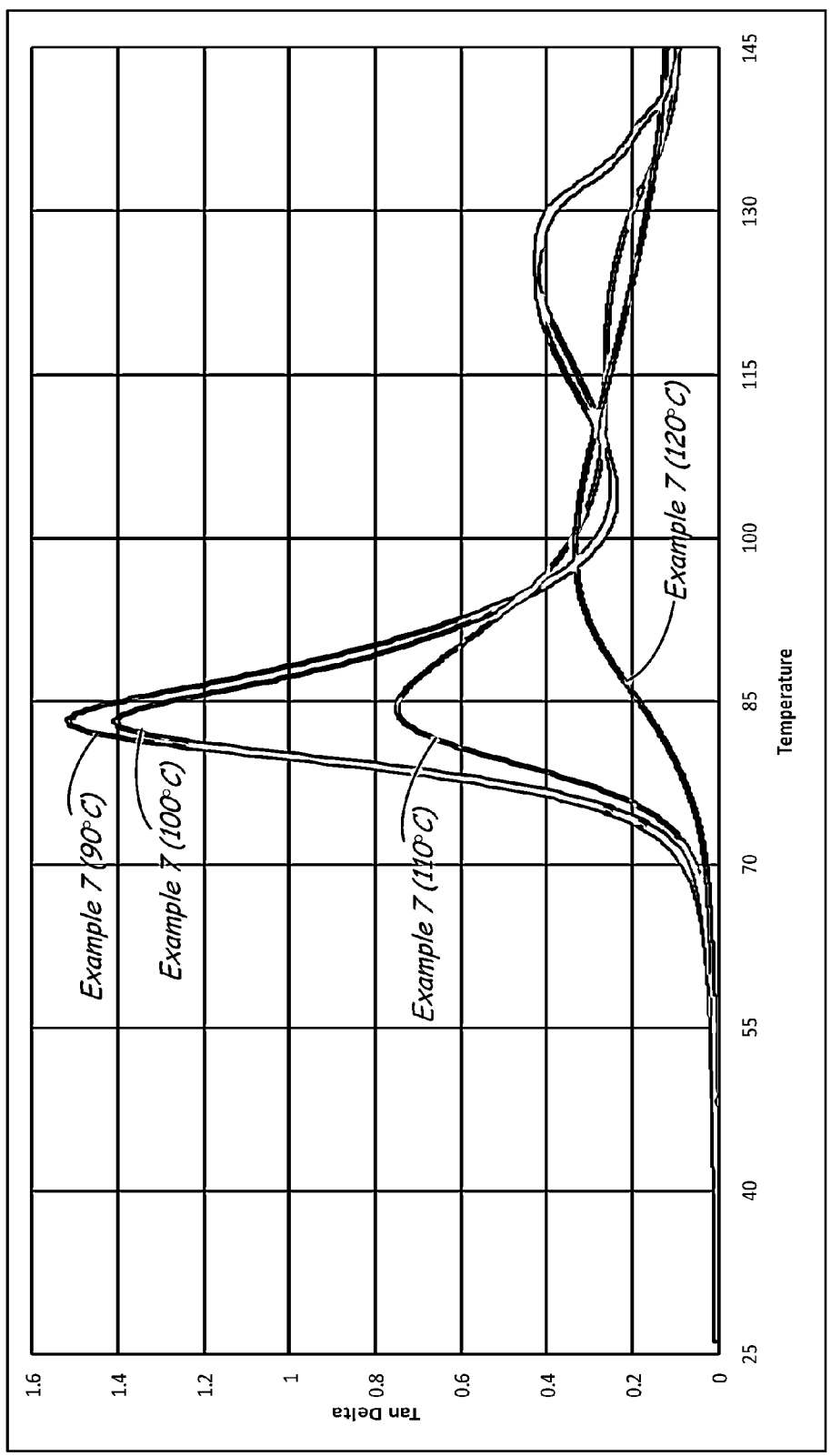
FIG. 7 is a graphical illustration of the tan-delta results for the example PET part materials shown in FIG. 6.

As can be seen, over a heated chamber temperature range of about 30 degrees Celsius, the dynamic mechanical behavior of the tested part materials changed significantly from almost mostly amorphous to almost mostly crystalline. This is further illustrated by the tan-delta peak onset in FIG. 7, where the peak onset occurred later as the temperature in the heated chamber increased, which corresponded to a more crystalline 3D part. Accordingly, these results confirm that the extent of crystallization in the resulting 3D part for the part materials can be controlled by a properly-selected annealing window.

The part material of Example 8 included 70% by weight of the PET blend of Example 7 and 30% by weight of a glass-based filler. The part material of Example 8 was also printed as discussed above for the part materials of Example 6, where the heated chamber was held at only 80° C. to maintain a mostly-amorphous mechanical behavior. A portion of the 3D part samples were then reheated to about 135° C. (i.e., a post-printing crystallization process) for a sufficient duration to re-crystallize the semi-crystalline PET in the part material.

Figure 8:
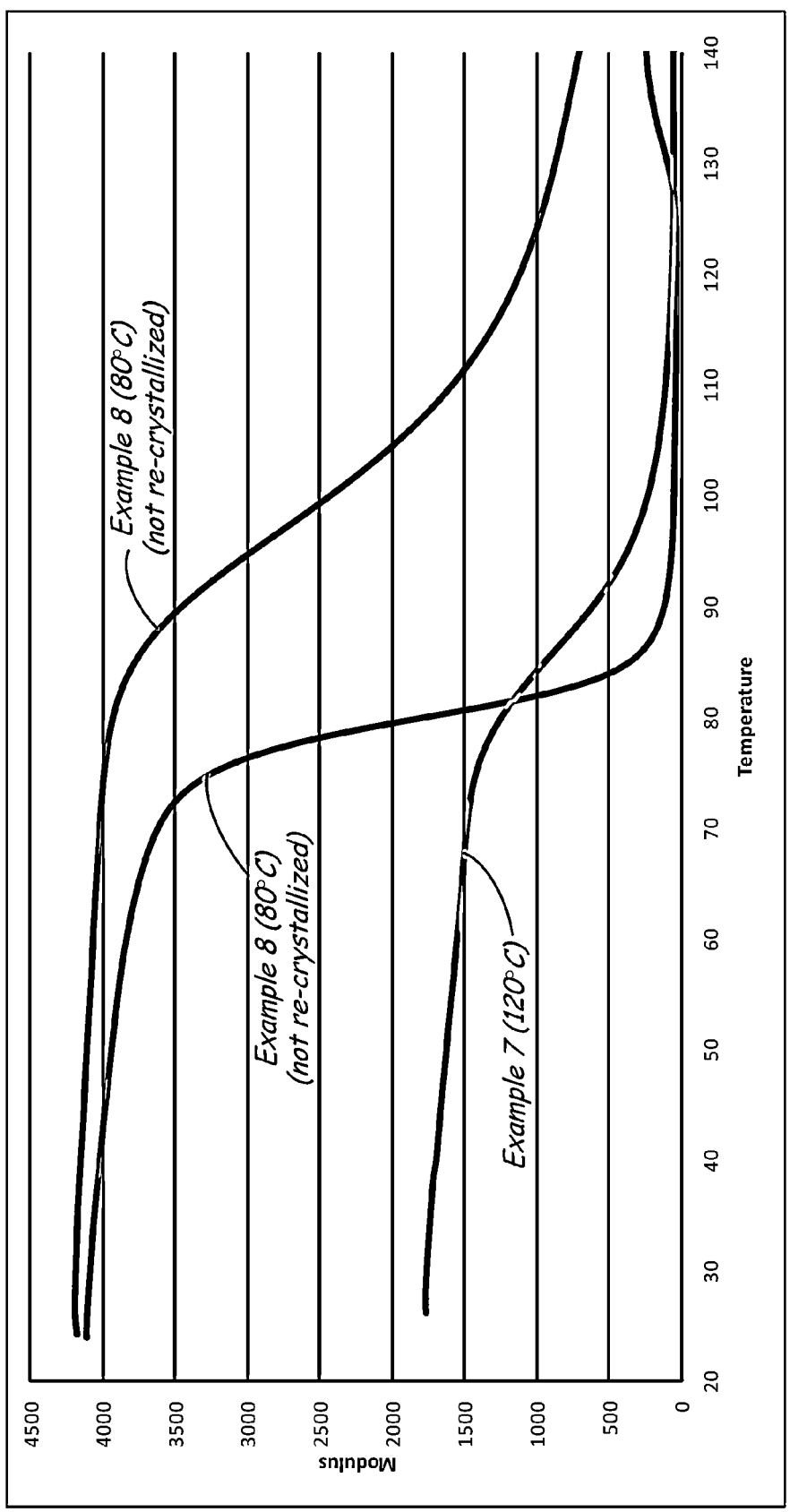
FIG. 8 is a graphical illustration of modulus versus temperature for example PET part materials, illustrating crystallization effects of a post-printing crystallization process.

After being printed, each 3D part sample was then slowly heated and the resulting modulus was measured, as illustrated in FIG. 8, which also compares the results of the part material for Example 7 printed in the 120° C. heated chamber. As shown in FIG. 8, the post-printing crystallization process significantly increased the crystallinity of the part material compared to the initial samples.

Although the present disclosure has been described with reference to preferred embodiments, workers skilled in the art will recognize that changes may be made in form and detail without departing from the spirit and scope of the disclosure.

The invention claimed is:

1. A method for printing a three-dimensional part with an additive manufacturing system, the method comprising:
providing a part material compositionally including one or more semi-crystalline polymers and one or more secondary materials that are configured to retard crystallization of the one or more semi-crystalline polymers, wherein the one or more secondary materials are substantially miscible with the one or more semi-crystalline polymers;
melting the part material in the additive manufacturing system;
forming at least a portion of a layer of the three-dimensional part from the melted part material in a build environment; and
maintaining the build environment at an annealing temperature that is between a glass transition temperature of the part material and a cold crystallization temperature of the part material.

2. The method of claim 1, wherein the one or more secondary materials comprise one or more amorphous polymers.

3. The method of claim 2, wherein the one or more amorphous polymers constitute from about 50% by weight to about 85% by weight of a combined weight of the one or more semi-crystalline polymers and the one or more amorphous polymers.

4. The method of claim 1, wherein the one or more semi-crystalline polymers comprise one or more semi-crystalline polyamides, and wherein the one or more secondary materials comprise one or more amorphous polyamides.

5. The method of claim 1, wherein the one or more semi-crystalline polymers comprise one or more one or more polyaryletherketones, and wherein the one or more secondary materials comprise one or more polyetherimides.

6. The method of claim 1, and further comprising performing a post-printing crystallization step on the printed three-dimensional part.

7. The method of claim 1, wherein the one or more semi-crystalline polymers are polymerized from one or more base monomers, and wherein the one or more secondary materials comprise one or more second semi-crystalline polymers polymerized from one or more monomers that are isomers of the one or more base monomers.

8. The method of claim 7, wherein the one or more semi-crystalline polymers and the one or more second semi-crystalline polymers each comprise one or more polylactic acid polymers, one or more polyetherketoneketone polymers, or one or more polyesters.

9. A method for printing a three-dimensional part from with an additive manufacturing system, the method comprising:
providing a part material that compositionally comprises one or more semi-crystalline polymers and one or more amorphous polymers that are substantially miscible with the one or more semi-crystalline polymers;
maintaining a build environment of the additive manufacturing system, at least in a deposition region of the build environment, at an annealing temperature that is between a glass transition temperature of the part material and a cold crystallization temperature of the part material;
feeding the part material to a print head retained by of the additive manufacturing system;
melting the part material in the print head;
extruding the melted part material from the print head; and
depositing the extruded part material onto a build surface in the deposition region to form at least a portion of a layer of the three-dimensional part from the extruded part material.

10. The method of claim 9, wherein the one or more semi-crystalline polymers comprise one or more semi-crystalline polyamides, and wherein the one or more amorphous polymers comprise one or more amorphous polyamides.

11. The method of claim 10, wherein the one or more amorphous polymers constitute from about 50% by weight to about 85% by weight of a combined weight of the one or more semi-crystalline polymers and the one or more amorphous polymers.

12. The method of claim 8, and further comprising selecting the annealing temperature to achieve a predetermined crystallinity level for the part material of the printed three-dimensional part.

13. The method of claim 8, wherein the one or more amorphous polymers are configured to retard crystallization of the one or more semi-crystalline polymers.

14. The method of claim 8, and further comprising performing a post-printing crystallization step on the printed three-dimensional part.

15. A method for printing a three-dimensional part with an additive manufacturing system, the method comprising:
providing a part material that compositionally comprises one or more semi-crystalline polymers and one or more amorphous polymers that are substantially miscible with the one or more semi-crystalline polymers;
melting the part material in the additive manufacturing system;
forming layers of the three-dimensional part from the melted part material using an additive manufacturing technique, wherein the layers are formed in a region that is maintained at an annealing temperature that is within 10° C. of a glass transition temperature of the part material; and
reheating the printed three-dimensional part to one or more temperatures that are within about 10° C. of a cold crystallization temperature of the part material.

16. The method of claim 15, wherein a re-crystallization temperature is within about 5° C. of the cold crystallization temperature of the part material.

17. The method of claim 15, wherein reheating the printed three-dimensional part to the one or more temperatures is performed for at least about 30 minutes.

18. The method of claim 15, wherein the reheating step is performed in a separate oven from the additive manufacturing system.

19. The method of claim 18, and further comprising separating the three-dimensional part from a build sheet used to received the formed layers of the three-dimensional part.

20. The method of claim 15, wherein the one or more semi-crystalline polymers comprise one or more semi-crystalline polyamides, and wherein the one or more amorphous polymers comprise one or more amorphous polyamides.

* * * * *